United States Patent Office 2,876,077
Patented Mar. 3, 1959

2,876,077

PROCESS FOR THE PRODUCTION OF STABILIZED LIQUID OZONE

John F. Haller, Niagara Falls, N. Y., assignor to Olin Mathieson Chemical Corporation, a corporation of Virginia No Drawing. Application May 17, 1955
Serial No. 509,106

6 Claims. (Cl. 23—222)

This invention relates to improvements in the manufacture of ozone and relates more particularly to improvements in the vaporization, condensation and other handling of concentrated liquid ozone compositions. Still more particularly, it relates to the use of elemental fluorine or chlorine trifluoride in such processes.

In the usual method of preparing ozone, it is produced in the gaseous state by passing a stream of oxygen, oxygen-enriched air or air, preferably dry, through a silent electric discharge to form a dilute gaseous mixture. This mixture will usually contain about 6 to 8 volume percent of ozone when oxygen is used. For most laboratory processes, the ozone content of the effluent gas stream is used immediately, for example, to react with unsaturated organic compounds for the production of ozonides and their decomposition products.

More recently however, liquefied ozone has found utility as an oxidant with rocket fuels. (See U. S. Patent 2,704,274 for a discussion in some detail of this use.) Liquid ozone preparation, storage and shipment have involved new problems. Using known precautions, the hazards once encountered in the production of gaseous ozone can now generally be avoided. The production of liquefied ozone or liquid compositions rich in ozone is accompanied by new hazards not so well understood. Since ozone reacts vigorously with any reducing agent, contact of such materials with liquefied ozone compositions frequently results in disastrous explosions.

Using the precaution provided by the process of the present invention, ozone can be more safely prepared, liquefied and handled. Ozone boils at —112° C. at atmospheric pressure and oxygen boils at —183° C. Liquid ozone can be obtained by partial liquefaction of the dilute gaseous mixture of ozone and oxygen resulting from the action of the silent electric discharge or by complete liquefaction of the mixture and distillation of oxygen therefrom.

The process of the present invention results in the removal of all traces of reducing agents from the oxygen to be ozonized, from the resulting ozone and any surface with which the liquefied ozone composition comes in contact. In particular, the process comprises the use of fluorine or chlorine trifluoride or mixtures thereof prior to or simultaneously with the production of liquefied ozone compositions.

The process can be carried out in any of several ways. The preferred method is by the introduction of fluorine or chlorine trifluoride in suitable proportions into the gaseous stream of ozonized oxygen prior to condensation. In this mode of operation ozonizers composed largely of glass parts can be used without the necessity of any change in prior art processes for producing gaseous ozone. Following the ozonizer, all parts of the equipment are necessarily fabricated of materials resisting the action of ozone and fluorine. Suitable materials are, for example, polytetrafluoroethylene (Teflon), nickel and stainless steel. When the ozonizer is constructed of fluorine resistant materials, the fluorine or chlorine trifluoride can be introduced into the stream of oxygen to be ozonized.

When the effluent gas is sufficiently cooled, ozone liquefies therefrom but the more volatile fluorine remains to a large extent in the vapor phase, pervading the container and effectively cleansing it with respect to any material reactive with liquid ozone. The ozone is thus safely stored in the receiver.

In another mode of applying the process of the present invention, all tubes, vessels or other parts which are to contain liquefied ozone compositions are first flushed with fluorine or chlorine trifluoride. This removes every trace of reducing agent from the surfaces to be contacted by the ozone composition. This effectively removes the hazard in condensing, distilling or otherwise handling liquefied ozone compositions.

Very small amounts of fluorine or chlorine trifluoride are usually sufficient for the process of this invention. Ordinarily, only mere traces of oxidizable organic material or other reducing agents with respect to ozone are likely to be present and only enough of the fluorine or chlorine trifluoride to react therewith is required. To ensure safe operation, at least about one part by volume of fluorine or chlorine trifluoride per million parts by volume of ozone is used and the proportion can range up to 1000 parts per million or about 0.1 percent by volume or more. The amount of fluorine or chlorine trifluoride introduced is insufficient to affect the properties of the ozone for the purposes for which it is commonly used.

The utility of this invention is especially important in the storage, shipment and use of liquid ozone compositions. The safe handling of liquid ozone is much simpler and more practical using the process of the present invention.

*Example I*

Dry oxygen gas is passed through a conventional glass ozonizer to provide an effluent stream containing 7 volume percent of ozone. A stream of fluorine is introduced into the effluent gas in the proportion of 50 parts by volume per million parts by volume of ozone produced. The ozone is condensed using liquid oxygen as coolant to provide a liquid consisting essentially of ozone and containing small proportions of dissolved oxygen. Fluorine has a considerable lower boiling point than ozone, —188° as compared with —112° C. Its presence in the vapor phase when the ozone is condensed ensures contact with every part of the container for the condensed ozone and therefore safe storage of the composition. Minor proportions of fluorine may dissolve in the liquid ozone and be retained thereby. Most of the unchanged oxygen is not condensed.

*Example II*

The substitution of a mixture of 25 parts by volume of fluorine and 25 parts by volume of chlorine trifluoride per million of ozone for the fluorine employed in Example I and otherwise repeating the procedure of Example I gives substantially the same results.

*Example III*

Before starting a laboratory size ozonizer, about 0.1 gram of chlorine trifluoride is introduced as a gas into a Teflon tube provided for the effluent ozone-oxygen mixture and the chlorine trifluoride is passed successively through a condenser, receiver and a fractionating column at room temperature. The flow of oxygen to the ozonizer is then started. The effluent stream of ozonized oxygen is condensed into the receiver, subsequently to be used as a distillation flask. The condenser is cooled with liquid nitrogen and a composition rich in ozone but containing some oxygen collects in the receiver. The fractionating column is controlled by supplying liquid ozone boiling at atmospheric pressure as reflux and the fractionation is continued until substantially all the oxygen is removed overhead, leaving a substantially pure liquefied ozone in the receiver used as distillation pot. These operating conditions avoid explosive decompositions.

*Example IV*

A stream of fluorine is introduced into a stream of oxygen in the proportion of 5 parts by volume per million parts by volume of oxygen. The mixture is passed through an ozonizer in which all of the parts normally contacted by the gas mixture are constructed of Teflon. The effluent stream is cooled with liquid nitrogen to condense liquid ozone. The presence of fluorine in the vapor phase when the ozone is condensed insures contact with every part of the container for the condensed ozone and therefore safe storage of the composition.

I claim:

1. In the production of stabilized liquid ozone by ozonizing gaseous oxygen, the step of introducing into the ozone a material selected from the group consisting of fluorine and chlorine trifluoride in amount within the range from 1 to 1000 parts per million by volume, based on the volume of ozone produced, and sufficient to stabilize the ozone against explosive decomposition when in the liquid state and thereafter condensing the ozone to form liquid ozone.

2. The method of claim 1 wherein said material is fluorine.

3. The method of claim 1 wherein said material is chlorine trifluoride.

4. The method of claim 1 wherein said material is introduced into the gaseous effluent from the ozonizing step prior to the condensation of the ozone.

5. The method of claim 1 wherein said material is introduced into the ozone by introducing said material into the oxygen prior to the introduction of the oxygen into the ozonizing step.

6. The method of claim 1 wherein said material is introduced into the ozone by first flushing the receiver for the condensed ozone with said material in gaseous form and thereafter condensing in said receiver the ozone produced.

References Cited in the file of this patent

UNITED STATES PATENTS

| | | |
|---|---|---|
| 2,637,688 | Ryan | May 5, 1953 |
| 2,700,648 | Thorp et al. | Jan. 25, 1955 |